Nov. 4, 1941.   C. T. KNUDTSON   2,261,520
HAND TRUCK
Filed Feb. 23, 1940   2 Sheets-Sheet 1
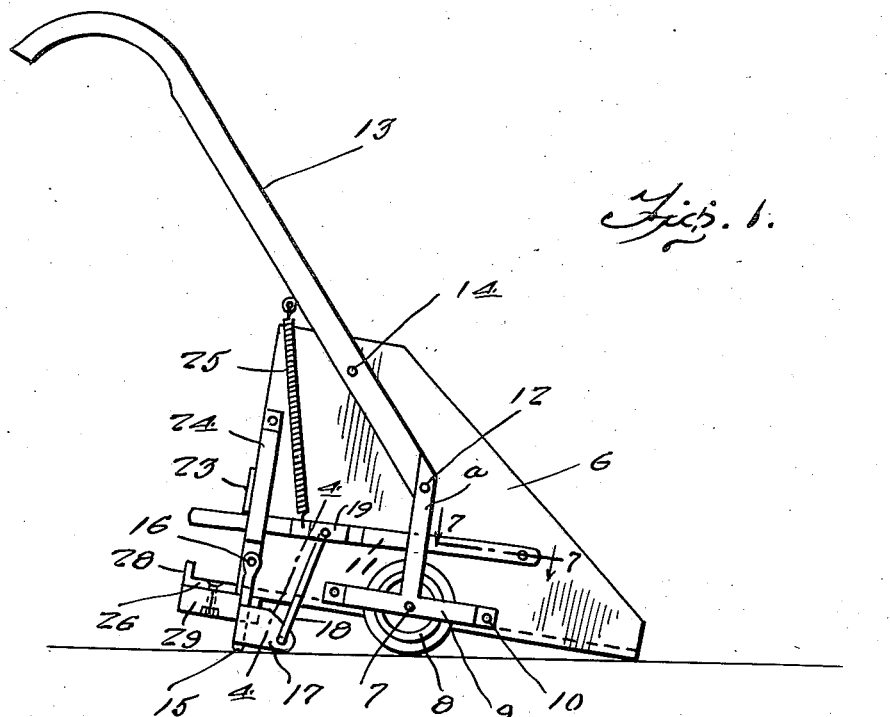
Fig. 1.
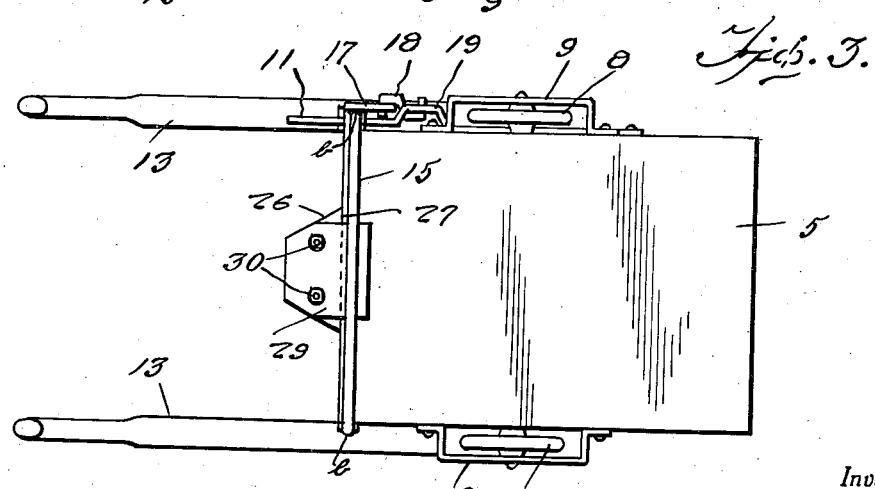
Fig. 3.
Fig. 7.
Inventor
Carl Theodore Knudtson
By Clarence A. O'Brien
Attorney Nov. 4, 1941.                C. T. KNUDTSON                2,261,520
                                HAND TRUCK
                           Filed Feb. 23, 1940            2 Sheets-Sheet 2
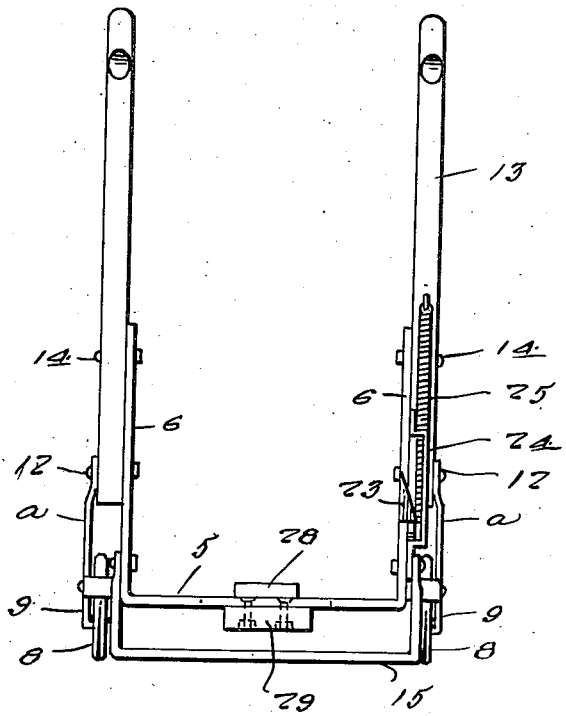
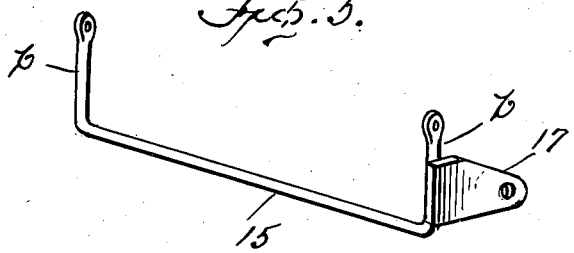
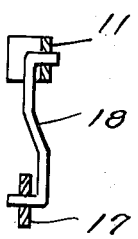
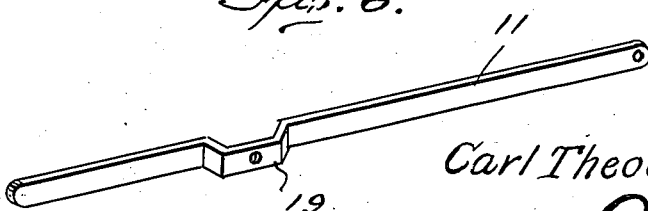
Inventor
Carl Theodore Knudtson
By Clarence A. O'Brien
Attorney Patented Nov. 4, 1941

2,261,520

UNITED STATES PATENT OFFICE 2,261,520

HAND TRUCK

Carl Theodore Knudtson, Blue Earth, Minn.

Application February 23, 1940, Serial No. 320,507

1 Claim. (Cl. 280—51)

This invention appertains to new and useful improvements in hand trucks and more particularly to a truck for handling ice cream cans, boxed goods and various other items difficult to handle manually.

An important object of the invention is to provide a hand truck, the bottom of which is mounted in close relation to the floor or ground, to the end that the possibility of tipping over is practically eliminated.

Another important object of the invention is to provide a hand truck of the character stated which can be retained in an inclined position with one end resting on the ground or floor, while being loaded or unloaded.

Other objects and advantages of the invention will become apparent to the reader of the following specification.

In the drawings:

Figure 1 represents a side elevational view of the truck.

Figure 2 is a rear elevational view.

Figure 3 is a bottom plan view.

Figure 4 is a section on the line 4—4 of Figure 1.

Figure 5 is a perspective view of the prop.

Figure 6 is a perspective view of the hand lever.

Figure 7 is a section on the line 7—7 of Figure 1.

Referring to the drawings wherein like numerals designate like parts, it can be seen that the truck includes a bottom 5 and upstanding side walls 6, the forward portions of which are cut away, so that the side walls are actually of forwardly tapering construction.

Stub axles 7 project laterally from the side walls 6 and on these are mounted the wheels 8. Inverted T-shaped frame members 9 have their end portions secured to the side walls 6 as at 10 and these frames cage the wheels 8, with the upstanding portion a thereof acting as guide for a hand lever 11. The upper end of the portion a of each frame 9 is secured as at 12 to the lower end of the corresponding hand bar 13, which is further secured as at 14 to the corresponding walls 6.

The hand lever 11 serves to control the prop 15. This prop is of U-shape. The upper ends of its leg portions b—b are pivotally secured as at 16 to the rear ends of the side walls 6. A short plate 17 extends forwardly from one of the legs b and the substantially S-shaped link member 18 connects the same with the offset intermediate portion 19 of the hand lever 11.

As shown in Figure 7, a bolt 20 extends through the forward end of the hand lever 11 and through the corresponding side walls 6 and has a compression spring 21 thereon between the head 22 of the bolt and the lever 11. The bolt extends through an oversized opening in the hand bar lever 11 so that the hand lever 11 can be moved laterally to a certain extent to avoid the keeper 23 which projects laterally from the wall 6 as suggested in Figure 1. This keeeper is of beveled construction and obviously by pushing the lever 11 downwardly in the guide 24, against the tension of the spring 25, the prop 15 will be swung downwardly to the lowered position shown in Figure 1, and when the lever 11 engages under the keeper 23, the prop will be held in the inclined position shown in Figure 1, so that cans and other items can be slid directly from the ground or floor onto the truck bottom 5.

A plate 26 has one end welded to the bottom of the truck as at 27 while its other end portion is tapered and provided with an upstanding flange 28 to prevent cans or other items from sliding backwards off the truck bottom. A supporting block of wood 29 can be secured by bolts 30 to the bottom side of this plate 26.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A wheeled vehicle of the character described comprising a body having a bottom and side walls, wheels supporting the vehicle, said bottom being underslung with respect to the wheels, a U-shaped stand having its upper end portions pivotally connected to the rear portions of the side walls, said stand being adapted to depend below the rear portion of the bottom and provided with a member projecting forwardly from one leg portion thereof, hand bars attached to the side walls, a pivotal lever on one side wall, said lever having an offset portion, a link between the offset portion and the forwardly projecting member on the stand, and a tension spring interposed between the hand lever and one of the hand bars and being adapted to pull the hand lever upwardly to swing the stand forwardly.

CARL THEODORE KNUDTSON.